US011922811B2

(12) United States Patent
Nardin

(10) Patent No.: US 11,922,811 B2
(45) Date of Patent: Mar. 5, 2024

(54) APPARATUS FOR CONTROLLING PARKING IN A PARKING STALL

(71) Applicant: Alberto Nardin, Regina (CA)

(72) Inventor: Alberto Nardin, Regina (CA)

( * ) Notice: Subject to any disclaimer, the term of this patent is extended or adjusted under 35 U.S.C. 154(b) by 232 days.

(21) Appl. No.: 17/587,335

(22) Filed: Jan. 28, 2022

(65) Prior Publication Data

US 2022/0246033 A1 Aug. 4, 2022

Related U.S. Application Data

(60) Provisional application No. 63/184,502, filed on May 5, 2021, provisional application No. 63/144,098, filed on Feb. 1, 2021.

(51) Int. Cl.
*G08G 1/14* (2006.01)

(52) U.S. Cl.
CPC ............ *G08G 1/142* (2013.01); *G08G 1/146* (2013.01); *G08G 1/148* (2013.01)

(58) Field of Classification Search
None
See application file for complete search history.

(56) References Cited

U.S. PATENT DOCUMENTS

| | | | | |
|---|---|---|---|---|
| 6,946,974 | B1 * | 9/2005 | Racunas, Jr. | G06Q 10/02 705/13 |
| 8,831,970 | B2 | 9/2014 | Weik, III et al. | |
| 2008/0030373 | A1 * | 2/2008 | Montgomery | G08G 1/14 705/13 |
| 2013/0124270 | A1 * | 5/2013 | Tziperman | G07B 15/02 705/13 |
| 2015/0138001 | A1 | 5/2015 | Davies et al. | |
| 2016/0328961 | A1 * | 11/2016 | Garcês Cadenas | G08G 1/147 |
| 2017/0004710 | A1 * | 1/2017 | Dozono | G07F 17/24 |
| 2017/0206471 | A1 * | 7/2017 | Dermosessian | G06Q 20/42 |
| 2020/0213329 | A1 * | 7/2020 | Simons | H04L 9/0618 |
| 2020/0242924 | A1 * | 7/2020 | Publicover | G08G 1/087 |

* cited by examiner

*Primary Examiner* — John F Mortell

(74) *Attorney, Agent, or Firm* — Adrian D. Battison; Ade & Company Inc.; Ryan W. Dupuis

(57) ABSTRACT

An apparatus is provided for controlling parking in a parking stall including a camera to take images of a vehicle entering the parking stall, a proximity or ultrasonic sensor arranged to detect entry of the vehicle into the parking stall and a device for broadcasting an audible message to the driver. The device communicates with a web site associated with a plurality of stalls each having an associated control apparatus where the web site contains and provides data to a customer relating to any one or more of the associated stalls where authorized use can be purchased.

20 Claims, 2 Drawing Sheets

APPARATUS FOR CONTROLLING PARKING IN A PARKING STALL

This invention relates to an apparatus for controlling parking in a parking stall accessible to an authorized user.

BACKGROUND OF THE INVENTION

Misuse or unauthorized use of parking stalls by persons other than the authorized user is a problem which remains unsolved. Thus the authorized user does not obtain the proper use of the stall for which they are authorized, often at significant cost. In some cases this is by error in that the unauthorized person does not realize. In other cases it is deliberate.

Also, because the use of stalls cannot be controlled, many such stalls are unused even when not required by the authorized user leading to a potential shortage of parking availability and to a potential loss of revenue for the authorized user.

SUMMARY OF THE INVENTION

It is an object of the present invention to provide a device arranged to be mounted in a parking stall and employed to preserve a parking stall for its rightful user and to make best use of the stall.

According to the invention there is provided an apparatus for controlling parking in a parking stall accessible to an authorized user, the apparatus comprising:

a housing for mounting at a mounting point adjacent the parking stall;

a camera mounted in the housing arranged to take images of a vehicle when driven by a driver for entering the parking stall;

a device for broadcasting an audible message to the driver;

at least one proximity sensor and/or ultrasonic sensor arranged to detect entry of the vehicle into the parking stall;

a control system;

the control system including a communication system arranged for communication with the authorized user;

the control system being arranged so that:

when the presence of the vehicle is detected by the proximity sensor, the control system is arranged to determine authorized use or unauthorized use by the vehicle;

in response to a determination of unauthorized use, the control device is arranged to emit said audible message informing the driver of the unauthorized vehicle that the unauthorized vehicle is not authorized to use the parking stall;

to transmit user information identifying the unauthorized vehicle and to receive a signal indicating when an unauthorized use is approved.

In one preferred arrangement the control system is arranged to stream live video of the unauthorized vehicle and driver to the authorized user using the communication system.

In one preferred arrangement, after information identifying the unauthorized vehicle is transmitted to the authorized user, the driver of the unauthorized vehicle can choose to pay for parking in the stall and if agreed will receive from the authorized user a signal indicating the unauthorized use is approved.

In one preferred arrangement, in the event that no authorized use is available, the control system provides an audible message to the driver confirming this.

In one preferred arrangement the control system is arranged to transmit to the authorized user to a mobile device using a cellular network.

In one preferred arrangement the control device, in order to determine authorized use, includes a reader which is responsive to a remote FOB of an authorized vehicle. In addition or as an alternative, in order to determine authorized use, the device camera has image recognition for the option of programming recognizable images such as a license plate.

In some cases where no communication is available, the control system can operate without communicating to the authorized user.

In one preferred arrangement the control system is arranged relative to the proximity sensor to determine whether the vehicle has interrupted the sensor briefly, whether the vehicle is stationary, or whether the vehicle is getting closer to the sensor and remains stationary for a time greater than a set time.

In one preferred arrangement, when an unauthorized vehicle is in the stall, the authorized user can transmit a recorded personalized message to the unauthorized vehicle. This enables the authorized user to record a specific message which may indicate that the stall is never available or that the stall may be purchased at specific times when it can be available.

In one preferred arrangement there are provided LED lights for providing a visible a warning to the unauthorized vehicle.

In one preferred arrangement the housing carries a readable code such as a QR code readable by a mobile device of the driver of the unauthorized vehicle for access to a web site which provides data and information relating to this particular stall.

In one preferred arrangement the apparatus is associated with a web site containing information relating to authorized use of the parking stall including this stall and any others associated with the system.

In one preferred arrangement the web site is associated with a plurality of stalls each having an associated control apparatus and wherein the web site contains and provides data to a customer relating to any one or more of the associated stalls where authorized use can be purchased or otherwise made available. In this arrangement, preferably the web site contains and provides data to a customer relating to an approved time of authorized use and non-availability of authorized use of one or more stalls.

In one preferred arrangement the web site communicates with the authorized user through an internet connection to determine whether authorized use is available.

In one preferred arrangement the web site communicates with the authorized users of a plurality of parking stalls so as to provide input by the authorized users through an internet connection of data relating to the availability for purchase of each stall and associated times of availability. In this arrangement, the web site is identified by a machine-readable code or QR code provided on the housing.

In one preferred arrangement the control system includes a short-range communication system for communication with a smart phone for control and setting and communicates with the driver of the unauthorized vehicle by voice message without using the short-range communication system.

In one preferred arrangement the control system is arranged for monitoring a plurality of parking stalls. That is for example the housing may be mounted between two stalls so as to receive information from the proximity sensor of a vehicle entering either stall and so as to communicate by the recorded messages with the driver of any vehicle entering either stall. This of course reduces hardware costs.

Preferably in one embodiment the control system is arranged to transmit to the rightful user information identifying the vehicle and to receive from the rightful user a signal indicating rightful or authorized use or unauthorized use. In this way, the authorized user can allow the approaching vehicle to enter if the driver and/or vehicle are known to the authorized user or if a payment transaction can be arranged by which the use is authorized.

Preferably in one embodiment a camera streams live video to the authorized user of the vehicle and driver to enable recognition and approval if suitable. That is, the control system can transmit to the rightful user the question via their mobile device, "Do you recognize this vehicle?".

The Parking Stall Saver including a sound/light/video version is a device mounted in a parking stall and employed to preserve a parking stall for its rightful user, hence, preventing unauthorized vehicles from parking in the stall.

Preferably in one embodiment, in order to determine authorized use, the device camera has image recognition for the option of programming recognizable images such as vehicle markings or other features of the vehicle, a license plate, when visible, for automatic parking authorization.

Preferably in one embodiment the device works by internet communications in the form of a programming application (app) when it can connect to the internet; otherwise, it works via the FOB method or by the recognition method without communicating to the authorized user.

When an unauthorized vehicle is parked in a stall where the device is employed, the device emits a very loud alarm sound, a very visible flashing red coloured LED, in the shape of an "X" lights up, a voice command politely warns the driver that the vehicle will be towed, and the camera streams live video of the driver and unauthorized vehicle. The alarm sound and lights continue until the unauthorized vehicle has been fully removed from the parking stall detection area. The device may include Face Recognition of the infringement to be communicated to the parking stall owner or authorized user. In some cases, optional messages can be sent to a towing company and on social media websites. The goal is to immediately make it clear to the unauthorized vehicle's driver to promptly remove the vehicle, and to have the vehicle removed if the transgression continues.

When the device recognizes an authorized vehicle, a very visible green coloured LED, in the shape of a "Checkmark" lights up, the alarm does not sound and there is no infringement notification video.

The camera can be constantly active, streaming live online and connected for nonstop online viewing if required. The device will have its own APP and/or online program to send constant messages and video to the authorized parking stall owner.

The proximity sensors are always active and aim outwards. In one preferred arrangement, two sensors are provided where one sensor is directed so that it aims to the right at a 60-degree angle from the wall or guard rail and the other is directed to the left at a 120-degree angle. Thus, both sensors are constantly detecting when a motor vehicle approaches from straight on, or from the left or right of the parking stall.

The sensors are programmed to determine whether a vehicle has interrupted the sensors briefly, whether the vehicle is stationary, or whether the vehicle is getting closer to the sensors and remains stationary for more than 5 seconds. As a vehicle approaches, the microprocessor determines the amount of time one or both of the proximity sensors remain in detection mode. If the vehicle or driver (if on a motorbike) contains a remote FOB with the proper code to match the remote FOB receiver inside the device, then the device will remain silent and allow the authorized vehicle to park.

If an unauthorized vehicle, that is there is no recognition of a properly coded remote FOB, in the path of both sensors remains stationary for a suitable period of time for example more than 5 seconds, and has entered into a zone within a suitable distance such as of the order of 2 metres of the sensors, the device, through the APP, sends a live video stream to its Owner. The Owner then receives the question via their mobile device, "Do you recognize this vehicle?". The Owner then chooses YES or NO. If YES, then no activation of the alarm on the device. If NO, the red "X" LED flashes, the APP sends an alarm notice to the parking stall owner, and the speaker emits a loud alarm sound. The alarm will be loud enough for the driver of the vehicle to hear even while inside the vehicle with the windows closed, this will then deter the driver from remaining in the parking stall. The speaker will also announce that live video is being streamed to the owner of the stall and to the tow company.

The Owner also has a programmable option for the "Do you recognize this vehicle?" stage, wherein the answer can be set to "YES" or "NO" for a pre-set duration of time. This option is useful on occasions when the Owner cannot reply to the APP when notified. If either "YES" or "NO" are NOT entered within 10 seconds of receiving the notification, the default answer is "NO". Remotely, via the internet, or onsite via Bluetooth, the Owner can, at any time, turn the device alarm ON or OFF, or permit parking via payment acceptance.

The device recognizes authorized vehicles if and when a properly coded remote FOB is within a suitable distance, such as of the order of 4 metres from the remote FOB receiver inside the device. This FOB is an option, but not necessary for the function of the device. If no FOB is present, the Owner will need to answer the APP or website to authorize the parking of ANY vehicle.

The device camera has image recognition for the option of programming recognizable images such as a license plate when visible, or other features of the vehicle, plus the camera can read a coded card hanging from the rear-view mirror, for automatic parking authorization used in handicap or public parking stalls. That is the system can be set up so that authorized and approved handicapped persons can receive a QR code or other identification symbol by which the camera of the device can obtain data confirming that the vehicle approaching is authorized to park at the stall concerned.

The device can also operate so that instead of an alarm sound or similar, when an unauthorized vehicle is in the stall, the owner can record a personalized message or whatever he/she chooses such as music. The recording time can be 15 or 30 seconds and repeat itself till the vehicle leaves or pays to remain. Also, like the doorbell systems used on homes, through an APP or online program the owner can talk in real time to the person in the stall in areas where wifi is available.

Yet further, a "Pay on the spot" feature can be added where an Unauthorized vehicle's owner can choose, either by way of a payment card tap feature or more preferably by way of an account previous established at the web site, to pay for parking in the stall. The payment device is linked to the authorized owner/user of the parking stall for immediate acceptance. Once again, this feature is possible when wifi is capable in the area. If no wifi is available, payment and authorization to park in the stall is pre-arranged with the Owner.

In cold weather regions, the device can have an electric receptacle built-in, as part of its assembly, providing electrical power to the parking stall. Furthermore, in cold weather regions where electricity is provided in the parking stall, the hard-wired version of the device can have a heating element inside its housing to ensure proper functionality during extreme cold.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 2:
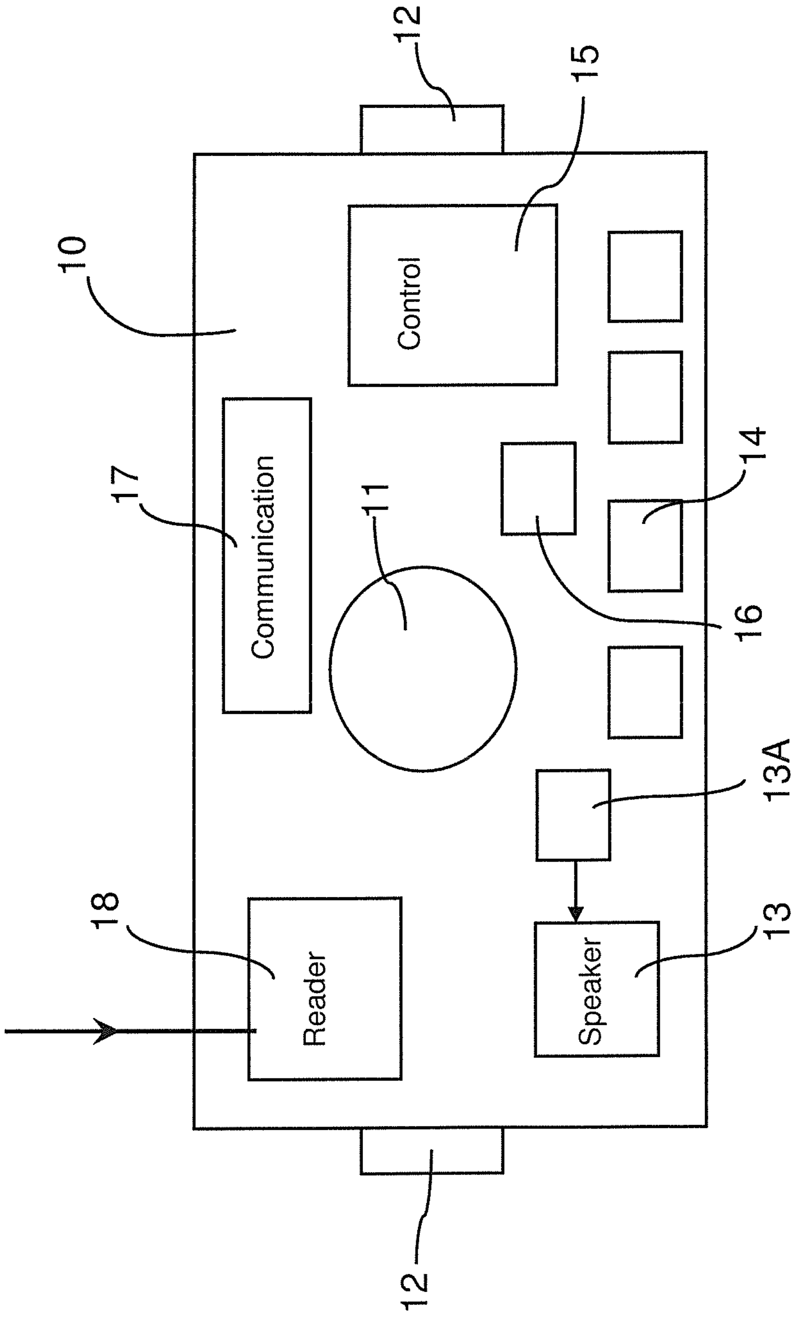
FIG. 2 is a schematic illustration of the components of the apparatus itself for use in the system of FIG. 1

As shown in FIG. 2, the device comprises a housing 10 containing proximity sensors 12, a video camera 11, warning lights 14 and a broadcast speaker 13 operated by a driver 13A.

Inside the device, there is provided a battery 16, a processor or control unit 15, a communications device 17 for communication with a cell phone system using a communications app and an RFID FOB reader 18.

The camera 11 is constantly active, streaming live online and connected for nonstop online viewing. The device has its own APP to send constant messages and video to the authorized parking stall user.

The proximity sensors 12 are always active and aim forward and outwards. One aims to the right at a 60 degree angle from the wall or guard rail and the other aims to the left at a 120 degree angle. Thus, both sensors 12 are constantly detecting when a motor vehicle approaches from straight on, or from the left or right of the parking stall.

The sensors 12 supply input signals to the control device 15 which is programmed to determine whether a vehicle has interrupted the sensors briefly, whether the vehicle is stationary, or whether the vehicle is getting closer to the sensors and remains stationary for more than 5 seconds. As a vehicle approaches, the micro processor 15 determines the amount of seconds one or both of the proximity sensors remain in detection mode. If the vehicle or driver contains or carries a remote FOB with the proper code to match the stored code at the remote FOB reader 18 inside the device, then the device will remain silent and allow the authorized vehicle to park.

If an unauthorized vehicle, that is there is no recognition of a properly coded remote FOB, in the path of both sensors remains stationary for more than 5 seconds, and has entered into a zone within 2 metres of the sensors, the device, through the APP, sends a live video stream through the communications interface 17 to the authorized user. The user then receives the question via their mobile device, "Do you recognize this vehicle?". The Owner then chooses YES or NO, if YES, then no activation of the alarm on the device. If NO, the blue and red LEDs flash, the APP sends an alarm notice to the parking stall owner, and the speaker emits a loud alarm sound. The alarm will be loud enough for the driver of the vehicle to hear even while inside his vehicle with the windows closed, this will then deter the driver from remaining in the parking stall. The speaker will also announce that live video is being streamed to the owner of the stall and to the tow company.

The device is programmed to recognize authorized vehicles if and when a properly coded remote FOB is within a distance of 4 metres from the remote FOB receiver. This FOB is an option, but not necessary for the function. If no FOB is present, the user will ALWAYS need to answer the APP to authorize the parking of ANY vehicle.

In one specific example, the device is a small metal enclosed box (approx. 150 mm×80 mm×50 mm) containing the two proximity sensors 12, the sound membrane (speaker) 13, one red LED and one green LED 14, a compartment housing a battery 16, the micro processor 15, the remote FOB receiver 18, the mini wireless camera 11. The device can be battery powered or may include an optional, solar panel (not shown) mounted on the outer top surface. The device also has an App for download when purchased.

Figure 1:
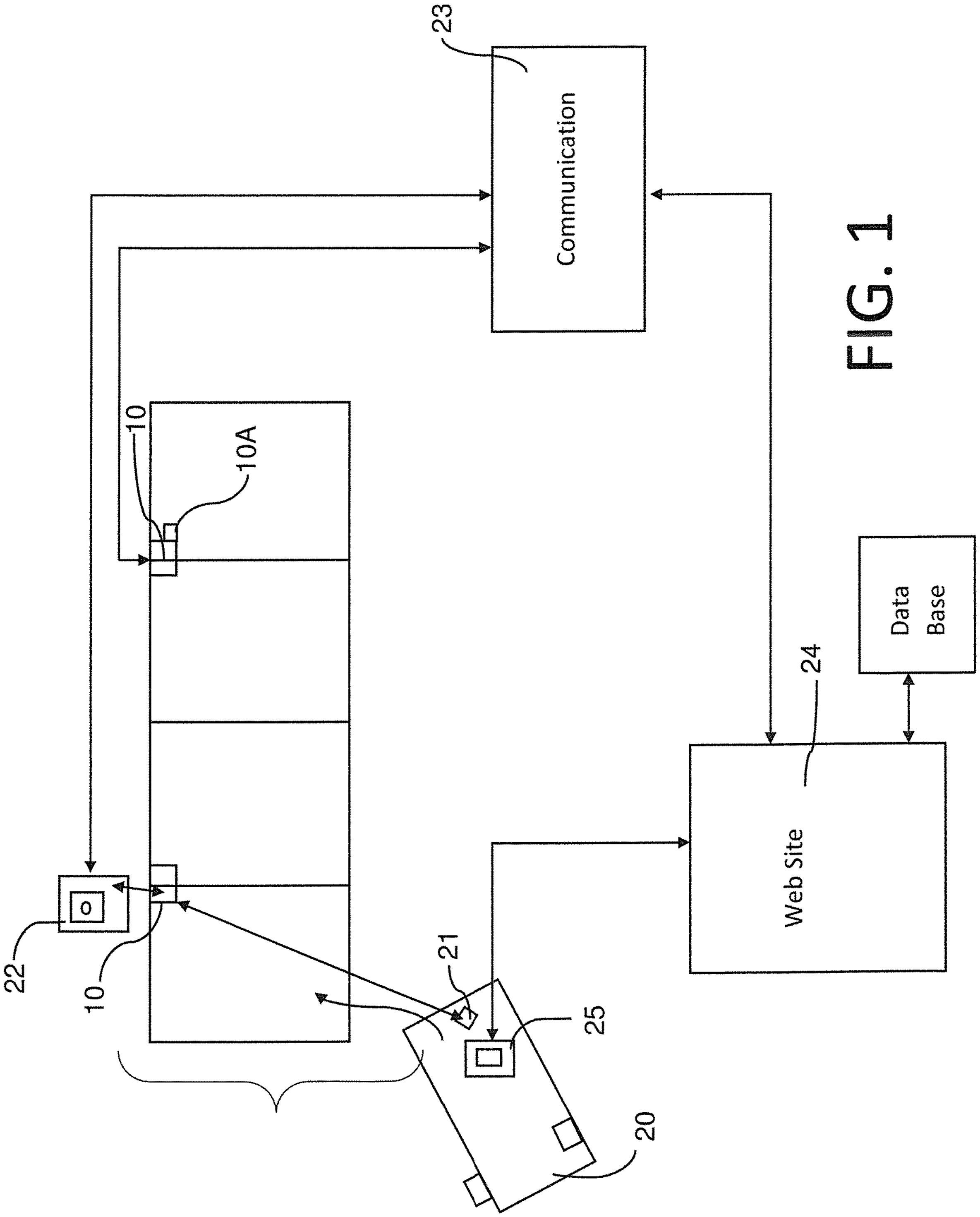
FIG. 1 is a schematic plan view of an apparatus according to the present invention in association with a web site and internet communication system for use in a parking system according to the present invention.

Turning now to FIG. 1, the device 10 is mounted at the junction between two stalls of an array of stalls for monitoring both stalls, if suitable. However one device per stall can be provided where the stalls are individually assigned to authorized users.

In this arrangement, the proximity sensors 12 detect the presence of a vehicle 20 which may contain a FOB or other short range communication device 21 for detecting whether the vehicle is authorized.

The device can also communicate using the short-range communication system 17 with an adjacent smart phone 22 for providing set up information including recorded messages.

The system also allows communication between the device 10 and an internet communication system and through that communication system to a web site 24. Communication can be through wifi and internet protocols or through mobile telephone technology.

The vehicle driver also typically will also have access to a mobile smart phone 25.

After information identifying the unauthorized vehicle is transmitted to the authorized user, the driver of the unauthorized vehicle can choose to pay for parking in the stall and if agreed will receive from the authorized user a signal indicating the unauthorized use is approved.

In the event that no authorized use is available, the control system provides an audible message to the driver confirming this through the speaker 13.

The housing 10 carries a readable QR code 10A which can be scanned using the mobile phone 25 of the approaching unauthorized driver to enable the driver to obtain access to the web site 24 though the communication system 23.

The web site can be programmed by the authorized users of a set of the stalls associated with the system with information relating to authorized use of the parking stall or stalls. Thus each user on purchase of the device communicates through the app with the web site to store information about the availability of allowed parking. This could include a permanent ban. This could include some availability and particular hours where the stall can be used. This can be programmed for future days in advance if known or can be entered in real time if circumstances change in the short term.

In this way, when the system is used by many holders of authorized stalls, a data base 24A associated with the web site will hold data on the availability of all stalls in the system.

In this way, the web site is associated with a plurality of stalls, at a single parking site or at many such sites, each having an associated control apparatus where the web site contains and provides data to a customer relating to any one or more of the associated stalls where authorized use can be purchased. Thus a vehicle driver becomes a potential customer rather than just an unauthorized user and can receive through the app details of all stalls where authorized use can be purchased. Thus the web site contains and provides data to the customer relating to an approved time of authorized use and non-availability of authorized use of one or more stalls. The customer therefore can choose a stall which best matches in available times the expected time of use by the customer. Using conventional mapping technology, the location of the stalls can be provided to the customer through the app. Having therefore identified a suitable stall and the location of that stall the customer can move to and by identified by the control device at the stall. The identification can be done by the camera or by programming through the QR code reading system which identifies the customer and the stall at which the device is located. The potential customers also may be provided with identification FOBs which allow identification while not providing authorization to any particular stall unless confirmed through the web site and the app.

In this way, the web site communicates with the authorized user through the internet connection to determine whether authorized use is available.

The specific design of the housing can take many forms and can be manufactured from different materials. The device will have, both, a wired and solar powered version and each will be preferably made of metal.

When an unauthorized vehicle is in the stall, an alarm will sound, red light flashing, and the stall Owner will be notified (when wi-fi available). When an authorized vehicle is in the stall, no alarm and the green light flashes.

The device can contain the following hardware:

Raspberry Pi 4, running Raspian Buster.

WiFi and Bluetooth communication.

5 MP 1080p HD camera for object recognition

A FOB receiver connected to a Raspberry I/O

An ultrasonic sensor or proximity sensor to detect any object in parking stall should camera stop working.

A Re-chargeable battery to power all components.

A 1" speaker to deliver warning message to violator.

Red and green light for visual warning.

Solar panel to recharge battery.

A FOB transmitter in car.

Polycarbonate cover over the solar panel, red/green light openings and QR code opening.

1" diameter barrel lock.

A backside mounting plate.

The device preferably is mounted between a min. of 3 feet from the ground to a maximum of 5 feet?

The device website will show the location of devices on the online map which Owners have signalled as "Available for parking" within a general proximity to where the potential client is searching for a vacant parking stall.

On the housing, a larger hole on the bottom is for the speaker and a smaller hole is for a barrel lock. One hole on the front of each is for the camera and the other for the sensor. The square knockouts are for the QR code. One version has 2 square knockouts. This device can be used for 2 parking stalls, each parking stall needs its own code. The square knockout on the back of each shell is for the eventual mounting plate. Each device has a clear Polycarbonate interior sleeve covering the opening for solar panels and knockouts are used for the indicate lights which show an "X" to indicate denial of entry and a "Checkmark" to indicate acceptance of entry.

Other arrangements do not offer is for the private Owner of the stall to make money. Owners of the present device can choose to be part of its entire online ecosystem to benefit monetarily. Further to the QR code directing a potential client to pay for parking, using the device allows private parking stall Owners, not just commercial parking lot landlords, to make money from people choosing to park in their private stalls.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for controlling parking in an individual parking stall which is individually specifically assigned to an authorized user, the apparatus comprising:

a housing constructed and arranged so as to be mounted at a mounting point adjacent the individual parking stall;

a camera mounted in the housing at the individual parking stall arranged to take images of the parking stall on a constant basis including images of a vehicle when driven by a driver for entering the individual parking stall;

a sound broadcasting device;

the sound broadcasting device being arranged for broadcasting a loud alarm warning signal;

the sound broadcasting device being arranged for broadcasting an audible verbal message to the driver;

at least one proximity or ultrasonic sensor arranged to detect entry of the vehicle into the parking stall;

a reader which is responsive to a remote FOB of an authorized vehicle;

a control system;

the control system including a communication system arranged for communication with the authorized user;

wherein the control system is arranged to communicate to the authorized user to a mobile device using a cellular network;

wherein the control system is arranged to stream live video of the unauthorized vehicle and driver to the authorized user using the communication system;

the control system being arranged so that:

when the presence of the vehicle is detected, the control system is arranged to determine authorized use or unauthorized use by the vehicle;

in response to a determination of unauthorized use, the control device is arranged to emit said warning signal and/or emit said audible verbal message informing the driver that the vehicle is not authorized to use the parking stall;

wherein, after information identifying the unauthorized vehicle is transmitted to the authorized user, the driver of the unauthorized vehicle can choose to pay for parking in the stall and if agreed will receive from the authorized user a signal indicating the unauthorized use is approved;

wherein, in the event that no authorized use is available, the control system provides said audible verbal message to the driver confirming this;

wherein, in the event that no authorized use is available, the control system provides said loud alarm warning signal;

and wherein, in the event that authorized use is available said audible verbal message is provided indicating that the authorized use is approved.

2. The apparatus according to claim 1 wherein, in order to determine authorized use, the device camera has image recognition for the option of programming recognizable images including a license plate.

3. The apparatus according to claim 1 wherein the control system can operate without communicating to the authorized user.

4. The apparatus according to claim 1 wherein the control system is arranged relative to the proximity sensor to determine whether the vehicle has interrupted the sensor briefly, whether the vehicle is stationary and whether the vehicle is getting closer to the sensor and remains stationary for a time greater than a set time.

5. The apparatus according to claim 1 wherein there are provided LED lights for providing a visible a warning to the unauthorized vehicle.

6. The apparatus according to claim 1 wherein the control system includes a short-range communication system for communication with a smart phone for control and setting and communicates with the driver of the unauthorized vehicle by voice message without using the short-range communication system.

7. The apparatus according to claim 1 wherein the control system is arranged for monitoring a plurality of parking stalls.

8. The apparatus according to claim 1 wherein the control system is arranged to obtain from an authorized handicapped person for example by QR code or other readable symbol that the vehicle approaching is authorised to use a handicap stall.

9. An apparatus for controlling parking in an individual parking stall which is individually specifically assigned to an authorized user, the apparatus comprising:

a housing constructed and arranged so as to be mounted at a mounting point adjacent the individual parking stall;

a camera mounted in the housing at the individual parking stall arranged to take images of the parking stall on a constant basis including images of a vehicle when driven by a driver for entering the individual parking stall;

a sound broadcasting device;

the sound broadcasting device being arranged for broadcasting a loud alarm warning signal;

the sound broadcasting device being arranged for broadcasting an audible verbal message to the driver;

at least one proximity or ultrasonic sensor arranged to detect entry of the vehicle into the parking stall;

a reader which is responsive to a remote FOB of an authorized vehicle;

a control system;

the control system including a communication system arranged for communication with the authorized user;

wherein the control system is arranged to communicate to the authorized user to a mobile device using a cellular network;

wherein the control system is arranged to stream live video of the unauthorized vehicle and driver to the authorized user using the communication system;

the control system being arranged so that:

when the presence of the vehicle is detected, the control system is arranged to determine authorized use or unauthorized use by the vehicle;

in response to a determination of unauthorized use, the control device is arranged to emit said warning signal and/or emit said audible verbal message informing the driver that the vehicle is not authorized to use the parking stall;

wherein, after information identifying the unauthorized vehicle is transmitted to the authorized user, the driver of the unauthorized vehicle can choose to pay for parking in the stall and if agreed will receive from the authorized user a signal indicating the unauthorized use is approved;

wherein, in the event that no authorized use is available, the control system provides said audible verbal message to the driver confirming this;

wherein, in the event that no authorized use is available, the control system provides said loud alarm warning signal;

wherein, in the event that authorized use is available said audible verbal message is provided indicating that the authorized use is approved;

wherein the apparatus is associated with a web site containing information relating to authorized use of the parking stall;

wherein the web site is associated with a plurality of stalls each having an associated control apparatus and wherein the web site contains and provides data to a customer relating to any one or more of the associated stalls where authorized use can be purchased;

wherein the web site is identified and accessed by a machine-readable code visible on the housing;

wherein the web site communicates with the authorized users of a plurality of parking stalls so as to provide input by the authorized users through an internet connection of data relating to the availability for purchase of each stall and associated times of availability;

wherein the web site contains and provides data to a customer relating to an approved time of authorized use and non-availability of authorized use of one or more stalls.

10. The apparatus according to claim 9 wherein there are provided LED lights for providing a visible a warning to the unauthorized vehicle.

11. The apparatus according to claim 9 wherein the web site communicates with the authorized user through an internet connection to determine whether authorized use is available.

12. The apparatus according to claim 9 wherein the housing has an electrical outlet receptacle built-in.

13. The apparatus according to claim 9 wherein the control system is arranged relative to the proximity sensor to determine whether the vehicle has interrupted the sensor briefly, whether the vehicle is stationary, or whether the vehicle is getting closer to the sensor and remains stationary for a time greater than a set time.

14. The apparatus according to claim 9 wherein the control system includes a short-range communication system for communication with a smart phone for control and setting and communicates with the driver of the unauthorized vehicle by voice message without using the short-range communication system.

15. The apparatus according to claim 9 wherein the control system is arranged for monitoring a plurality of parking stalls.

16. The apparatus according to claim 9 wherein the control system is arranged to obtain from an authorized handicapped person for example by QR code or other readable symbol that the vehicle approaching is authorised to use a handicap stall.

17. An apparatus for controlling parking in an individual parking stall which is individually specifically assigned to an authorized user, the apparatus comprising:

a housing constructed and arranged so as to be mounted at a mounting point adjacent the individual parking stall;

a camera mounted in the housing at the individual parking stall arranged to take images of the parking stall on a constant basis including images of a vehicle when driven by a driver for entering the individual parking stall;

a sound broadcasting device;

the sound broadcasting device being arranged for broadcasting a loud alarm warning signal;

the sound broadcasting device being arranged for broadcasting an audible verbal message to the driver;

at least one proximity or ultrasonic sensor arranged to detect entry of the vehicle into the parking stall;

a reader which is responsive to a remote FOB of an authorized vehicle;

the housing having an electrical outlet receptacle provided;

a control system;

the control system including a communication system arranged for communication with the authorized user;

wherein the control system is arranged to communicate to the authorized user to a mobile device using a cellular network;

wherein the control system is arranged to stream live video of the unauthorized vehicle and driver to the authorized user using the communication system;

the control system being arranged so that:

when the presence of the vehicle is detected, the control system is arranged to determine authorized use or unauthorized use by the vehicle;

in response to a determination of unauthorized use, the control device is arranged to emit said warning signal and/or emit said audible verbal message informing the driver that the vehicle is not authorized to use the parking stall;

wherein, after information identifying the unauthorized vehicle is transmitted to the authorized user, the driver of the unauthorized vehicle can choose to pay for parking in the stall and if agreed will receive from the authorized user a signal indicating the unauthorized use is approved;

wherein, in the event that no authorized use is available, the control system provides said audible verbal message to the driver confirming this;

wherein, in the event that no authorized use is available, the control system provides said loud alarm warning signal;

and wherein, in the event that authorized use is available said audible verbal message is provided indicating that the authorized use is approved.

18. The apparatus according to claim 17 wherein there are provided LED lights for providing a visible a warning to the unauthorized vehicle.

19. The apparatus according to claim 17 wherein the control system is arranged for monitoring a plurality of parking stalls.

20. The apparatus according to claim 17 wherein the control system is arranged to obtain from an authorized handicapped person for example by QR code or other readable symbol that the vehicle approaching is authorised to use a handicap stall.

* * * * *